March 8, 1949.  M. R. JOHNSON  2,463,626
FISH LURE

Filed Jan. 19, 1945  2 Sheets-Sheet 1

Inventor
MARTIN R. JOHNSON

By Randolph & Beavers
Attorney

March 8, 1949.　　　　M. R. JOHNSON　　　2,463,626
FISH LURE
Filed Jan. 19, 1945　　　　　　　　2 Sheets-Sheet 2
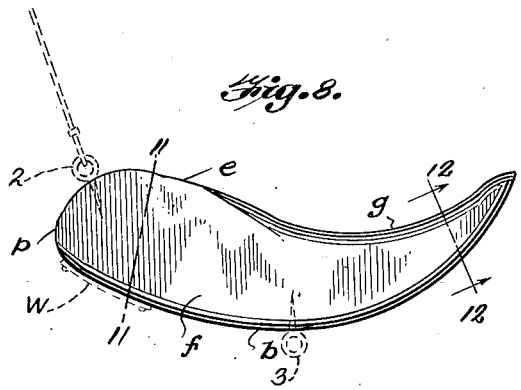
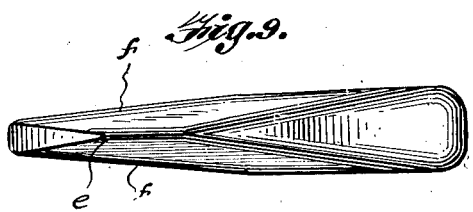
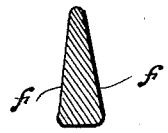 
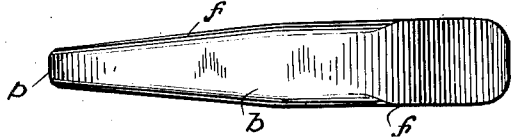
Inventor
MARTIN R. JOHNSON
By Randolph & Beavers
Attorney Patented Mar. 8, 1949

2,463,626

UNITED STATES PATENT OFFICE 2,463,626

FISH LURE

Martin R. Johnson, Cook, Minn.

Application January 19, 1945, Serial No. 573,590

4 Claims. (Cl. 43—42)

This invention relates to fish lures and is embodied in a body simulating the movements of a fish swimming through the water. This motion is made possible by the shape of the rear half which because of the rounded top surface sways to and fro and causes the body to roll on its side as it swings.

Other objects and advantages of the invention will appear hereinafter.

Reference is to be had to the accompanying drawings, in which.

Figure 1:
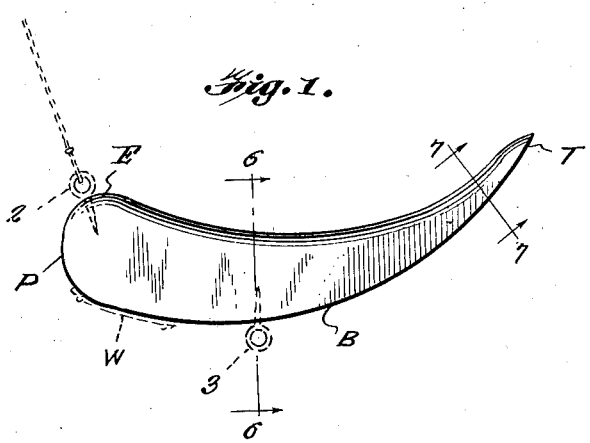
Figure 1 is a side elevation of my lure in the position it occupies in the water.
Figure 6:
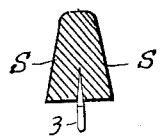
Figure 7:

Figures 6 and 7 are cross sectional views on lines 6—6 and 7—7, respectively, of Figure 1;

Figure 8 is a side elevation of a modified form of my lure;

Figure 9 is a top plan view of the modification;

Figure 10 is a bottom plan view of this modification;

Figures 11 and 12 are cross sectional views on lines 11—11 and 12—12, respectively, of Figure 8.

Figure 2:
Figure 2 is a top plan view of the same.
Figure 4:
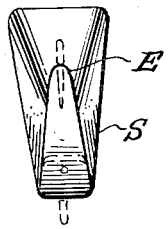
Figure 4 is an end view viewed from the left hand end of Figure 1.
Figure 3:
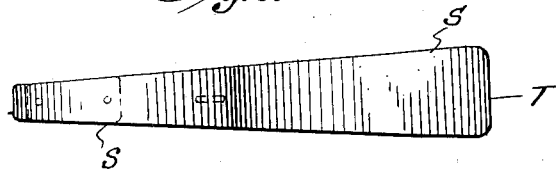
Figure 3 is a bottom plan view.
Figure 5:
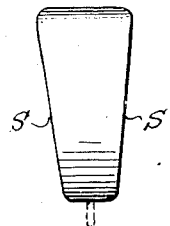
Figure 5 is a tail end view viewed from the right hand end of Figure 1.

The preferred form of my lure for casting illustrated in Figures 1-7 comprises a body of wood or other suitable material. The choice of wood is suggested by its low specific gravity by virtue of which it floats on the water; wood can be weighted exteriorly to assume any desired position in the water. The bottom surface B of the lure is substantially cylindrical, except at the front end P which is parabolic. The thickness of the body measured along the radius of the cylinder is a maximum at the left or front end and decreases rearwardly so that the top and bottom surfaces intersect at T. The width of the bottom surface is a minimum at the front end and increases towards the tail end. The sides S converge upwardly so as to form a blunt top edge E at the front, but their upward convergence decreases towards the tail end so, that as shown in Figure 3, they are almost parallel to one another at a point lying about ¼ of the entire length from the tail end. Beyond this point the sides merge with the rounded side edges of the upper surface, as seen in Figures 2 and 7, upwardly. The lure is streamlined because of the rounding off of the corners.

A screw 2 having a line attaching eye at the top is screwed into the rounded upwardly and forwardly tapered front end. From the point where the bottom surface becomes cylindrical a weighted plate W is attached thereto and covers about a fourth of that surface. At a point somewhat to the right of the lowest point of the bottom surface an eyebolt 3 is screwed into the body and may be used for the suspension of a weight to regulate the extent to which the tail end is above the level of the front end.

The modification of Figures 8–12 shows a lure for trolling having a bottom surface which is a fragment of a cylinder and into which merges a parabolic surface P forming the front end and having its shortest radius at the point of mergence into the cylindrical surface. The width of the cylindrical surface is a maximum at the rear end and decreases toward the front end. The width of the parabolic surface diminishes upwardly and tapers off at the top so as to form a blunt top edge e which is then rounded off. The two sides f converge upwardly and forwardly but merge into a curved elliptic top surface S bounding the rear half with the curvature of that surface diminishing towards the rear end.

What I claim as my invention and desire to secure by Letters Patent is:

1. A fish lure of floating material bounded at the bottom by an arcuate surface the width of which increases toward the rear end, at the front end by a surface having a parabolic curve and being of upwardly diminishing width, at the top by a concave surface intersecting at the tail with the arcuate surface, and at the sides by upwardly converging flat sides the upward convergence of which decreases rearwardly, and said flat sides merging with the concave top surface adjacent the tail portion.

2. A fish lure of floating material bounded at the bottom by an arcuate surface of rearwardly increasing width and merging at the front end into a surface having a parabolic curve and being of upwardly decreasing width, at the sides by flat upwardly converging sides forming a blunt edge at the front top, the convergence of the sides decreasing towards the rear end, and at the top by the blunt edge recited and a longitudinally concave surface into which the edge merges, the last named surface being transversely convex in the portion adjacent the rear end.

3. A fish lure comprising a body of buoyant material having an under side bowed outwardly in a direction longitudinally of the body and relatively to its axis, the upper side of the body being inwardly bowed in a longitudinal direction with respect to its axis, said body having a rounded forward end merging with the upper and under sides, and said body having side walls diminishing in width and merging with the upper and under sides adjacent the rear end of the lure, said rear end of the body being curved upwardly relatively to the forward end thereof.

4. A fish lure as in claim 3, said sides being disposed in upwardly converging relationship.

MARTIN R. JOHNSON.

REFERENCES CITED

The following references are of record in the file of this patent:

UNITED STATES PATENTS

| Number | Name | Date |
|---|---|---|
| 2,033,829 | Helin | Mar. 10, 1936 |
| 2,133,032 | Martz | Oct. 11, 1936 |
| 2,184,031 | Wyatt | Dec. 19, 1939 |